(12) United States Patent
Nakano

(10) Patent No.: US 7,780,327 B2
(45) Date of Patent: Aug. 24, 2010

(54) IMAGE GENERATING APPARATUS

(75) Inventor: Satoshi Nakano, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 318 days.

(21) Appl. No.: 12/015,807

(22) Filed: Jan. 17, 2008

(65) Prior Publication Data

US 2008/0175018 A1 Jul. 24, 2008

(30) Foreign Application Priority Data

Jan. 19, 2007 (JP) .............................. 2007-010825

(51) Int. Cl.
*H01L 33/00* (2010.01)
(52) U.S. Cl. ..................... 362/555; 362/85; 362/249.05
(58) Field of Classification Search ................. 362/555, 362/558, 85, 249.02, 249.05, 282; 345/170; 358/475; 200/314
See application file for complete search history.

(56) References Cited

U.S. PATENT DOCUMENTS

| 4,806,908 | A | * | 2/1989 | Krupnik | 341/22 |
| 5,713,458 | A | * | 2/1998 | Johnson et al. | 200/314 |
| 6,709,126 | B1 | * | 3/2004 | Leen | 362/95 |
| 7,129,432 | B2 | * | 10/2006 | Fujii et al. | 200/314 |
| 7,244,898 | B2 | * | 7/2007 | Kim | 200/314 |
| 2002/0075668 | A1 | * | 6/2002 | Dorrie | 362/27 |

FOREIGN PATENT DOCUMENTS

| JP | 5-41135 A | 2/1993 |
| JP | 8-241658 A | 9/1996 |
| JP | 2001-273093 A | 10/2001 |
| JP | 2003-257271 A | 9/2003 |

* cited by examiner

*Primary Examiner*—Stephen F. Husar
*Assistant Examiner*—Peggy A. Neils
(74) *Attorney, Agent, or Firm*—Crowell & Moring LLP

(57) ABSTRACT

An image generating apparatus capable of uniformly brightening an emission surface even when a light-emitting device portion is arranged on a position deviating from the center of the emission surface is obtained. This image generating apparatus includes a light-emitting device portion emitting light, a light guide member, so arranged as to enclose the light-emitting device portion, including a peripheral emission surface, a peripheric light guide portion guiding the light emitted from the light-emitting device portion to the emission surface and a dome portion, having a light guide function, provided inside the peripheric light guide portion continuously with the light guide portion for covering the light-emitting device portion and a lid member so provided as to cover the dome portion. The image generating apparatus further includes a wall portion adjusting the light emitted from the light-emitting device portion and guided to the peripheric emission surface.

17 Claims, 10 Drawing Sheets

IMAGE GENERATING APPARATUS

BACKGROUND OF THE INVENTION

1. Field of the Invention

The present invention relates to an image generating apparatus, and more particularly, it relates to an image generating apparatus comprising a light-emitting device portion emitting light for display.

2. Description of the Background Art

A switch and an operation mechanism each having a light-emitting device portion emitting light for display are known in general, as disclosed in each of Japanese Patent Laying-Open Nos. 08-241658 (1996), 2003-257271, 05-041135 (1993) and 2001-273093, for example.

The aforementioned Japanese Patent Laying-Open No. 08-241658 discloses a photodetective switch comprising a key top (switch portion) including an illumination portion (emission surface) on the top surface, a swing body including a support shaft supporting the key top from below and a light-emitting diode arranged under the swing body. In the photodetective switch described in Japanese Patent Laying-Open No. 08-241658, the illumination portion of the key top, the support shaft of the swing body and the light-emitting diode are aligned with each other, so that light emitted from the light-emitting diode can brighten the illumination portion of the key top through a light-guide through-hole formed inside the support shaft.

The aforementioned Japanese Patent Laying-Open No. 2003-257271 discloses an illuminative pushbutton switch device comprising a manipulator (switch portion), a tact plate (movable contact) arranged under the manipulator, a common armature (fixed contact) arranged under the tact plate, a storage portion storing the tact plate and the common armature and a light-emitting member. In the illuminative pushbutton switch device described in Japanese Patent Laying-Open No. 2003-257271, the manipulator, the tact plate and the common armature stored in the storage portion and the light-emitting member are aligned with each other, so that light emitted from the light-emitting member can brighten the manipulator through openings provided in the tact plate, the common armature and the storage portion respectively.

The aforementioned Japanese Patent Laying-Open No. 05-041135 discloses an illuminative push switch comprising a light-emitting button including a light-emitting device in the center thereof, a movable contact arranged under the light-emitting button and a translucent film so provided as to cover the light-emitting button. In the illuminative push switch described in Japanese Patent Laying-Open No. 05-041135, the upper side of the translucent filter can be brightened with light emitted upward from the light-emitting device provided in the light-emitting button and light emitted downward and reflected upward by the movable contact.

The aforementioned Japanese Patent Laying-Open No. 2001-273093 discloses an operating part mechanism comprising an operating part having a semispherical upper side surface and an LED arranged under the operating part. In the operating part mechanism described in Japanese Patent Laying-Open No. 2001-273093, the LED is arranged on a position opposed to the center of the lower side surface of the operating part while the lower side surface of the operating part is so semispherically formed that the distance between the lower side surface of the operating part and the LED is constant, whereby light emitted from the LED is transmitted through the lower side surface of the operating part without refraction for uniformly brightening the upper side surface.

In each of the various switches and buttons described in the aforementioned Japanese Patent Laying-Open Nos. 08-241658, 2003-257271 and 05-041135, however, the light-emitting device portion is arranged on the position opposed to the center of the emission surface of the switch portion in order to uniformly brighten the emission surface of the switch portion. If the light-emitting device portion is arranged on a position deviating from that opposed to the center of the emission surface of the switch portion, it is difficult to uniformly brighten the emission surface of the switch portion.

In the operating part mechanism described in the aforementioned Japanese Patent Laying-Open No. 2001-273093, the LED is arranged on the opposed to the center of the lower side surface of the operating part in order to uniformly brighten the semispherical upper side surface of the operating part. If the LED is arranged on a position deviating from that opposed to the center of the lower side surface of the operating part, it is difficult to uniformly brighten the upper side surface of the operating part.

SUMMARY OF THE INVENTION

The present invention has been proposed in order to solve the aforementioned problems, and an object of the present invention is to provide an image generating apparatus capable of uniformly brightening an emission surface even when a light-emitting device portion is arranged on a position deviating from the center of the emission surface.

An image generating apparatus according to a first aspect of the present invention comprises a light-emitting device portion emitting light for display, a light guide member, so arranged as to enclose the light-emitting device portion, including a peripheric emission surface, a peripheric light guide portion guiding the light emitted from the light-emitting device portion to the emission surface and a dome portion, having a light guide function, provided inside the peripheric light guide portion continuously with the light guide portion for covering the light-emitting device portion and a lid member so provided as to cover the dome portion of the light guide member, while the dome portion includes a first hole, and the lid member includes a wall portion inserted into the first hole of the dome portion for adjusting the light emitted from the light-emitting device portion and guided to the peripheric emission surface.

In the image generating apparatus according to the first aspect, as hereinabove described, the dome portion having the light guide function so provided as to cover the light-emitting device portion for display includes the first hole while the lid member so provided as to cover the dome portion of the light guide member includes the wall portion inserted into the first hole of the dome portion for adjusting the light emitted from the light-emitting device portion and guided to the peripheric emission surface so that the light emitted from the light-emitting device portion to pass through the dome portion can be guided to the peripheric emission surface in the state adjusted by the wall portion, thereby uniformly brightening the emission surface even when the light-emitting device portion is arranged on a position deviating from that opposed to the center of the emission surface of the light guide member.

In the aforementioned image generating apparatus according to the first aspect, the light-emitting device portion is preferably arranged on a position deviating from the center of the light guide member in plan view, and the wall portion is preferably arranged closer to the light-emitting device portion with respect to the center of the light guide member. When the luminous intensity on the side of the emission surface closer to the light-emitting device portion with respect to the center of the light guide member exceeds that on the opposite side due to the deviation of the light-emitting device portion from the center of the light guide member, therefore, the wall portion can block the light emitted from the side having the higher luminous intensity. Thus, the luminous intensity on the side of the emission surface closer to the light-emitting device portion with respect to the center of the light guide member and that on the opposite side can be equalized to each other, thereby uniformly brightening the emission surface.

In the aforementioned image generating apparatus according to the first aspect, the peripheric emission surface is preferably circumferentially formed in plan view, and the wall portion of the lid member is preferably arcuately formed along the circumferential emission surface to protrude downward from the first hole of the dome portion. According to this structure, the wall portion can be arranged along the circumferential emission surface, thereby guiding the light emitted from the light-emitting device portion to outgo from the dome portion through the first hole to the circumferential emission surface in a reliably adjusted state.

In this case, the first hole of the dome portion is preferably in the form of an arcuate slot corresponding to the arcuate wall portion. According to this structure, the shape of the first hole of the dome portion corresponds to that of the wall portion, whereby the wall portion of the lid member can be easily inserted into the first hole of the dome portion.

In this case, the wall portion preferably includes cylindrical positioning portions provided on both ends of the wall portion with an outer diameter substantially identical to the inner diameter of both ends of the first hole of the dome portion. According to this structure, the positioning portions provided on both ends of the wall portion are arranged on both ends of the first hole of the dome portion respectively when the wall portion is inserted into the first hole, whereby the position of the lid member with respect to the dome portion can be easily held.

In the aforementioned structure having the arcuate wall portion, the central angle of the arcuate wall portion about the center of the light guide member may be less than 180° in plan view.

In the aforementioned image generating apparatus according to the first aspect, the dome portion preferably further includes a second hole and the lid member preferably functions as an infrared filter member, while the image generating apparatus preferably further comprises an infrared receiving portion provided on a region covered with the dome portion to be adjacent to the light-emitting device portion. According to this structure, light such as visible light other than infrared light is not transmitted through the lid member while infrared light is transmitted through the lid member and can reach the infrared receiving portion through the second hole. Therefore, no infrared filter member may be separately provided for infrared communication, whereby increase in the number of components can be suppressed.

In the aforementioned structure having the dome portion provided with the second hole, the wall portion is preferably arranged oppositely to the second hole with respect to the center of the light guide member. Even when the luminous intensity on the side of the emission surface closer to the second hole with respect to the center of the light guide member is reduced due to the provision of the second hole, therefore, the wall portion arranged oppositely to the second hole with respect to the center of the light guide member can reduce the luminous intensity on the side of the emission surface opposite to the second hole with respect to the center of the light guide member. Thus, the emission surface can be uniformly brightened even when the second hole is provided on the dome portion.

In this case, the length of the wall portion in a first direction perpendicular to the extensional direction of a straight line connecting the centers of the wall portion and the second hole with each other may be larger than the length of the second hole in the first direction.

In the aforementioned image generating apparatus according to the first aspect, the wall portion is preferably arranged in the vicinity of the inner side of the peripheric light guide portion. According to this structure, the wall portion blocking light is so provided in the vicinity of the light guide portion that the light incident upon the light guide portion from the light-emitting device portion can be reliably blocked. Thus, the luminous intensity on the emission surface can be easily adjusted.

In the aforementioned image generating apparatus according to the first aspect, the wall portion is preferably integrally formed on the lid member. According to this structure, no wall member may be separately provided in order to uniformly brighten the emission surface of the light guide member, whereby increase in the number of components can be suppressed also by this.

An image generating apparatus according to a second aspect of the present invention comprises a light-emitting device portion emitting light for display, a light guide member, so arranged as to enclose the light-emitting device portion, including a peripheric emission surface, a peripheric light guide portion guiding the light emitted from the light-emitting device portion to the emission surface and a dome portion, having a light guide function, provided inside the peripheric light guide portion continuously with the light guide portion for covering the light-emitting device portion, a lid member so provided as to cover the dome portion of the light guide member and an infrared receiving portion provided on a region covered with the dome portion to be adjacent to the light-emitting device portion, while the dome portion includes a first hole and a second hole, the lid member includes a wall portion inserted into the first hole of the dome portion for adjusting the light emitted from the light-emitting device portion and guided to the peripheric emission surface, the peripheric emission surface is circumferentially formed in plan view, the wall portion of the lid member is arcuately formed along the circumferential emission surface to protrude downward from the first hole of the dome portion, the first hole of the dome portion is in the form of an arcuate slot corresponding to the arcuate wall portion, the wall portion includes cylindrical positioning portions provided on both ends of the wall portion with an outer diameter substantially identical to the inner diameter of both ends of the first hole of the dome portion, the lid member functions as an infrared filter member, and the wall portion is integrally formed on the lid member.

In the aforementioned image generating apparatus according to the second aspect, as hereinabove described, the dome portion, having the light guide function, so provided as to cover the light-emitting device portion for display includes the first hole while the lid member so provided as to cover the dome portion of the light guide member includes the wall portion inserted into the first hole of the dome portion for adjusting the light emitted from the light-emitting device portion and guided to the peripheric emission surface so that the light emitted from the light-emitting device portion to pass through the dome portion can be guided to the peripheric emission surface in the state adjusted by the wall portion, thereby uniformly brightening the emission surface even when the light-emitting device portion is arranged on a position deviating from that opposed to the center of the emission surface of the light guide member.

In the image generating apparatus according to the second aspect, further, the peripheric emission surface is circumferentially formed in plan view and the wall portion of the lid member is arcuately formed along the circumferential emission surface to protrude downward from the first hole of the dome portion so that the wall portion can be arranged along the circumferential emission surface, thereby guiding the light emitted from the light-emitting device portion to outgo from the dome portion through the first hole to the circumferential emission surface in a reliably adjusted state. Further, the first hole of the dome portion is in the form of the arcuate slot corresponding to the arcuate wall portion so that the shape of the first hole of the dome portion corresponds to that of the wall portion, whereby the wall portion of the lid member can be easily inserted into the first hole of the dome portion. In addition, the wall portion includes the cylindrical positioning portions provided on both ends thereof with the outer diameter substantially identical to the inner diameter of both ends of the first hole of the dome portion so that the positioning portions provided on both ends of the wall portion are arranged on both ends of the first hole of the dome portion respectively when the wall portion is inserted into the first hole, whereby the position of the lid member with respect to the dome portion can be easily held. Further, the dome portion includes the second hole and the lid member functions as the infrared filter member while the image generating apparatus comprises the infrared receiving portion provided on the region covered with the dome portion to be adjacent to the light-emitting device portion, whereby light such as visible light other than infrared light is not transmitted through the lid member while infrared light is transmitted through the lid member and can reach the infrared receiving portion through the second hole. Therefore, no infrared filter member may be separately provided for infrared communication, whereby increase in the number of components can be suppressed. Further, the wall portion is integrally formed on the lid member so that no wall member may be separately provided in order to uniformly brighten the emission surface of the light guide member, whereby increase in the number of components can be suppressed also by this.

In the image generating apparatus according to the second aspect, the light-emitting device portion is preferably arranged on a position deviating from the center of the light guide member in plan view, and the wall portion is preferably arranged closer to the light-emitting device portion with respect to the center of the light guide member. When the luminous intensity on the side of the emission surface closer to the light-emitting device portion with respect to the center of the light guide member exceeds that on the opposite side due to the deviation of the light-emitting device portion from the center of the light guide member, therefore, the wall portion can block the light emitted from the side having the higher luminous intensity. Thus, the luminous intensity on the side of the emission surface closer to the light-emitting device portion with respect to the center of the light guide member and that on the opposite side can be equalized to each other, thereby uniformly brightening the emission surface.

In the aforementioned image generating apparatus according to the second aspect, the central angle of the arcuate wall portion about the center of the light guide member may be less than 180° in plan view.

In the aforementioned image generating apparatus according to the second aspect, the wall portion is preferably arranged oppositely to the second hole with respect to the center of the light guide member. Even when the luminous intensity on the side of the emission surface closer to the second hole with respect to the center of the light guide member is reduced due to the provision of the second hole, therefore, the wall portion arranged oppositely to the second hole with respect to the center of the light guide member can reduce the luminous intensity on the side of the emission surface opposite to the second hole with respect to the center of the light guide member. Thus, the emission surface can be uniformly brightened even when the second hole is provided on the dome portion.

In this case, the length of the wall portion in a first direction perpendicular to the extensional direction of a straight line connecting the centers of the wall portion and the second hole with each other may be larger than the length of the second hole in the first direction.

In the aforementioned image generating apparatus according to the second aspect, the wall portion is preferably arranged in the vicinity of the inner side of the peripheric light guide portion. According to this structure, the wall portion blocking light is so provided in the vicinity of the light guide portion that the light incident upon the light guide portion from the light-emitting device portion can be reliably blocked. Thus, the luminous intensity on the emission surface can be easily adjusted.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a sublimatic printer 1 according to the embodiment of the present invention is described with reference to FIGS. 1 to 14. According to this embodiment, the present invention is applied to the sublimatic printer 1 employed as an exemplary image generating apparatus.

Figure 1:
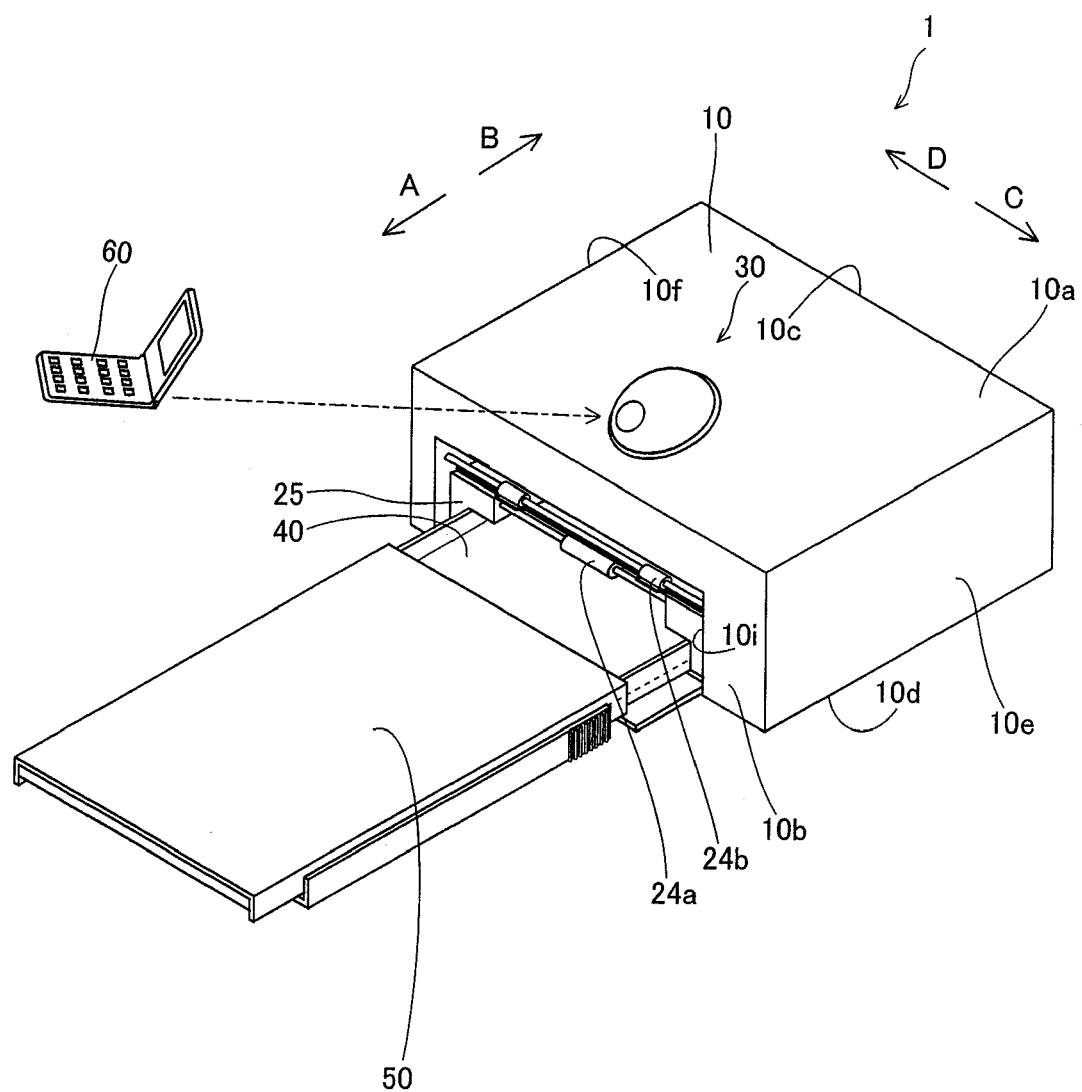
FIG. 1 is a perspective view showing the overall structure of a sublimatic printer according to an embodiment of the present invention.
Figure 2:
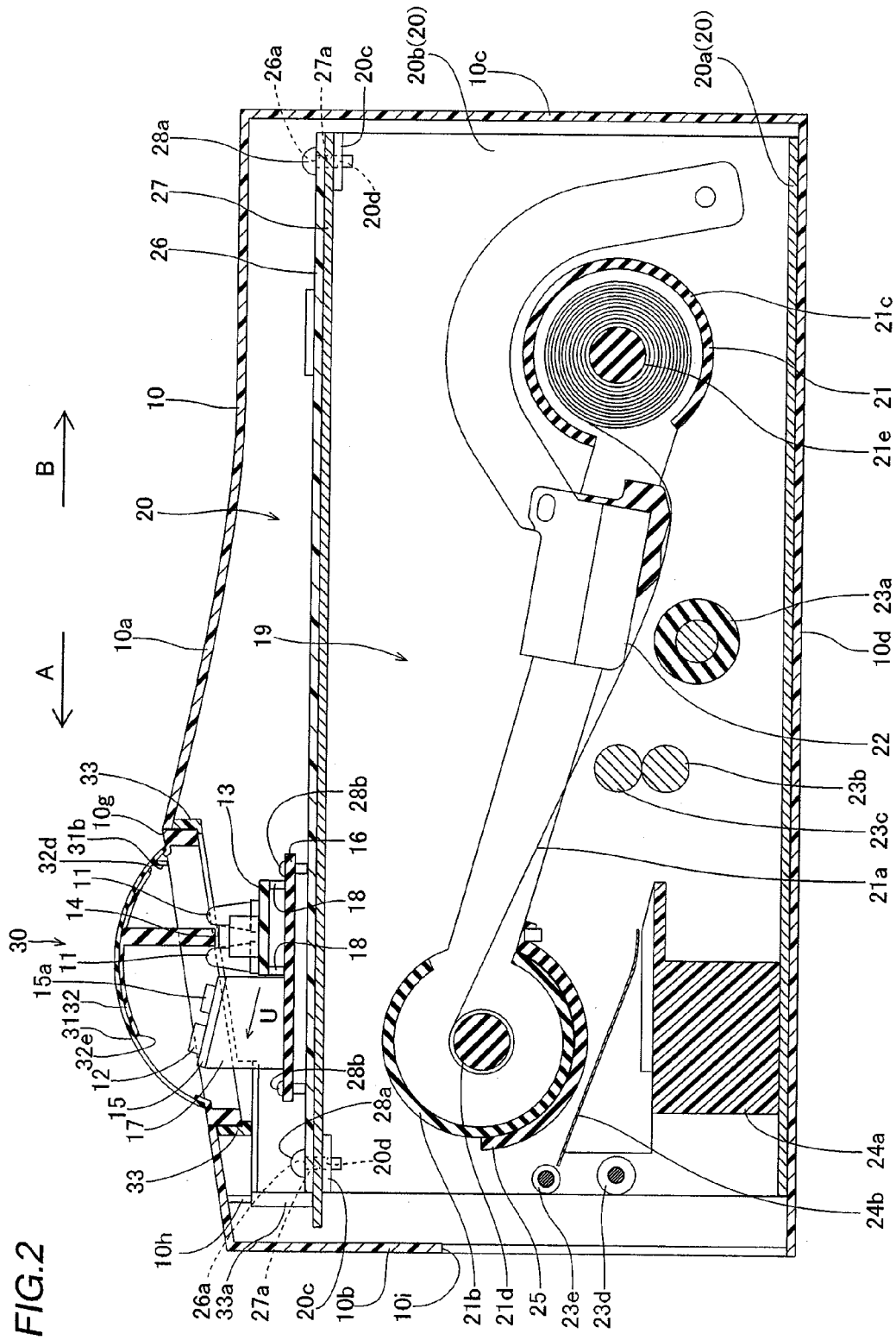
FIG. 2 is a sectional view of the sublimatic printer according to the embodiment of the present invention shown in FIG. 1.

As shown in FIGS. 1 and 2, the sublimatic printer 1 according to this embodiment comprises a housing 10, a printing portion 19 (see FIG. 2) stored in the housing 10 as described later and a power supply button 30 arranged on an upper surface 10a of the housing 10. A paper cassette 50 storing papers 40 is detachably mounted on a front surface 10b of the housing 10 along arrow A. According to this embodiment, a portable telephone 60 is assumed as an apparatus capable of making infrared communication with the sublimatic printer 1.

As shown in FIG. 1, the housing 10 is constituted of a back surface 10c along arrow B, a lower surface 10d, a side surface 10e along arrow C and another side surface 10f along arrow D, in addition to the aforementioned upper surface 10a and the front surface 10b along arrow A. The upper surface 10a of the housing 10 is inclined with respect to a horizontal plane, and has an opening 10g for mounting the power supply button 30 on the inclined surface, as shown in FIG. 2. Protrusions 10h for mounting the power supply button 30 are integrally provided on the inner side surface of the upper surface 10a of the housing 10 in front of the opening 10g (along arrow A). Further, a paper cassette mounting port 10i for mounting the paper cassette 50 (see FIG. 1) is provided on the front surface 10b of the housing 10.

Figure 3:
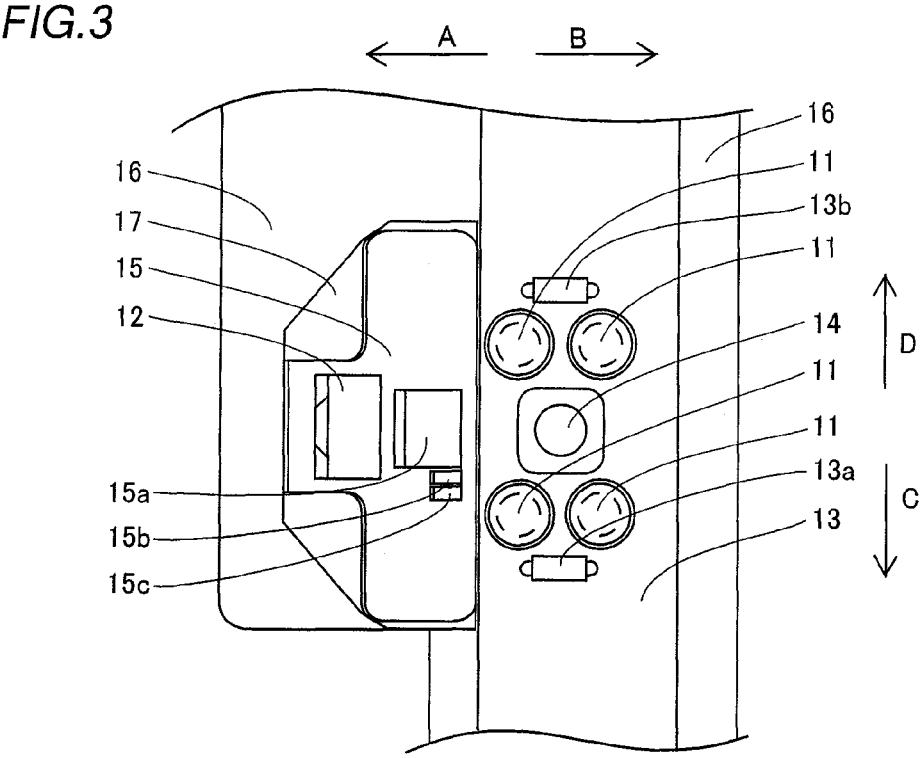
FIG. 3 is a plan view showing a portion around display LEDs of the sublimatic printer according to the embodiment of the present invention shown in FIG. 1.

According to this embodiment, four display LEDs 11 emitting light for display are provided in the housing 10 above the printing portion 19, while an infrared receiving portion 12 capable of receiving infrared signals is arranged on a position adjacent to the display LEDs 11, as shown in FIGS. 2 and 3. The display LEDs 11 are examples of the "light-emitting device portion" in the present invention.

The infrared receiving portion 12 can receive infrared signals from the potable telephone 60 (see FIG. 1) in the range of about 30° (±about 15°). The four display LEDs 11 are arranged on a horizontally set substrate 13, as shown in FIGS. 2 and 3. The substrate 13 is provided with a switch portion 14 arranged on a position enclosed with the four display LEDs 11 and electronic components 13a and 13b arranged on the sides of the four display LEDs 11 along arrows C and D respectively. The infrared receiving portion 12 is arranged on a substrate 15 set in a direction (along arrow U) upward by 15° with respect to the horizontal direction, as shown in FIG. 2. Thus, the infrared receiving portion 12 capable of receiving infrared signals in the range of about 30° (±about 15°) can receive infrared signals in the range of ±about 15° with respect to a direction upward by about 15° (in the range of about 30° upward from the horizontal plane) when the housing 10 is horizontally set. The substrate 15 is further provided with electronic components 15a, 15b and 15c set at the back of the infrared receiving portion 12 (along arrow B). The substrate 15 is supported by a substrate table 17 arranged on a base 16, as shown in FIGS. 2 and 3. The substrate 13 is set on the upper surface of the base 16 at the back of the substrate table 17 (along arrow B) through leg portions 18 (see FIG. 2).

As shown in FIG. 2, a chassis 20 of metal covers the bottom and side portions of the printing portion 19, while an ink sheet cartridge 21 storing an ink sheet 21a is mountable on the printing portion 19. The printing portion 19 includes a print head portion 22 for printing, a platen roller 23a opposed to the print head portion 22, a feed roller 23b of metal, a press roller 23c of metal pressing the feed roller 23b with prescribed pressing force, a paper feed roller 23d of rubber, a paper discharge roller 23e of rubber, a lower paper guide 24a of resin, an upper paper guide 24b of resin, an ink sheet cartridge support portion 25 supporting the ink sheet cartridge 21, a main substrate 26 and a top plate 27.

As shown in FIG. 2, the chassis 20 is formed by a bottom surface 20a, a first side surface (not shown) along arrow C in FIG. 1 and a second side surface 20b along arrow D. Pairs of mounting portions 20c for mounting the main substrate 26 are formed on the upper ends of the first side surface (not shown) and the second side surface 20b respectively. The mounting portions 20c are provided with threaded holes 20d fitted with screws 28a for fixing the main substrate 26. The ink sheet cartridge 21 includes a take-up portion 21b taking up the ink sheet 21a and a supply portion 21c supplying the ink sheet 21a. The take-up portion 21b and the supply portion 21c of the ink sheet cartridge 21 are provided with a take-up bobbin 21d and a supply bobbin 21e respectively. The main substrate 26 is mounted on the mounting portions 20c of the chassis 20 through the top plate 27. More specifically, the main substrate 26 is fixed by tightening the four screws 28a inserted into four holes 26a provided in the main substrate 26 and four holes 27a provided in the top plate 27 to the threaded holes 20d of the mounting portions 20c of the chassis 20. On the upper surface of the main substrate 26, the base 16 is mounted on a position opposed to the opening 10g provided in the upper surface 10a of the housing 10 with two screws 28b. Thus, the four display LEDs 11, the switch portion 14 and the infrared receiving portion 12 are opposed to the opening 10g.

Figure 4:
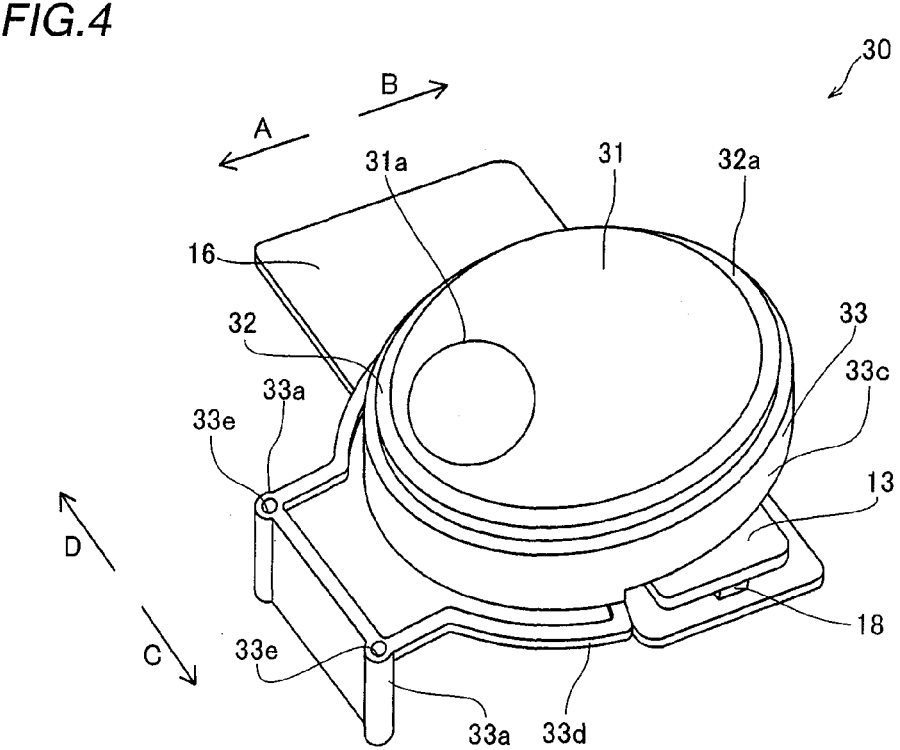
FIG. 4 is a perspective view showing a portion around a power supply button of the sublimatic printer according to the embodiment of the present invention shown in FIG. 1.
Figure 5:
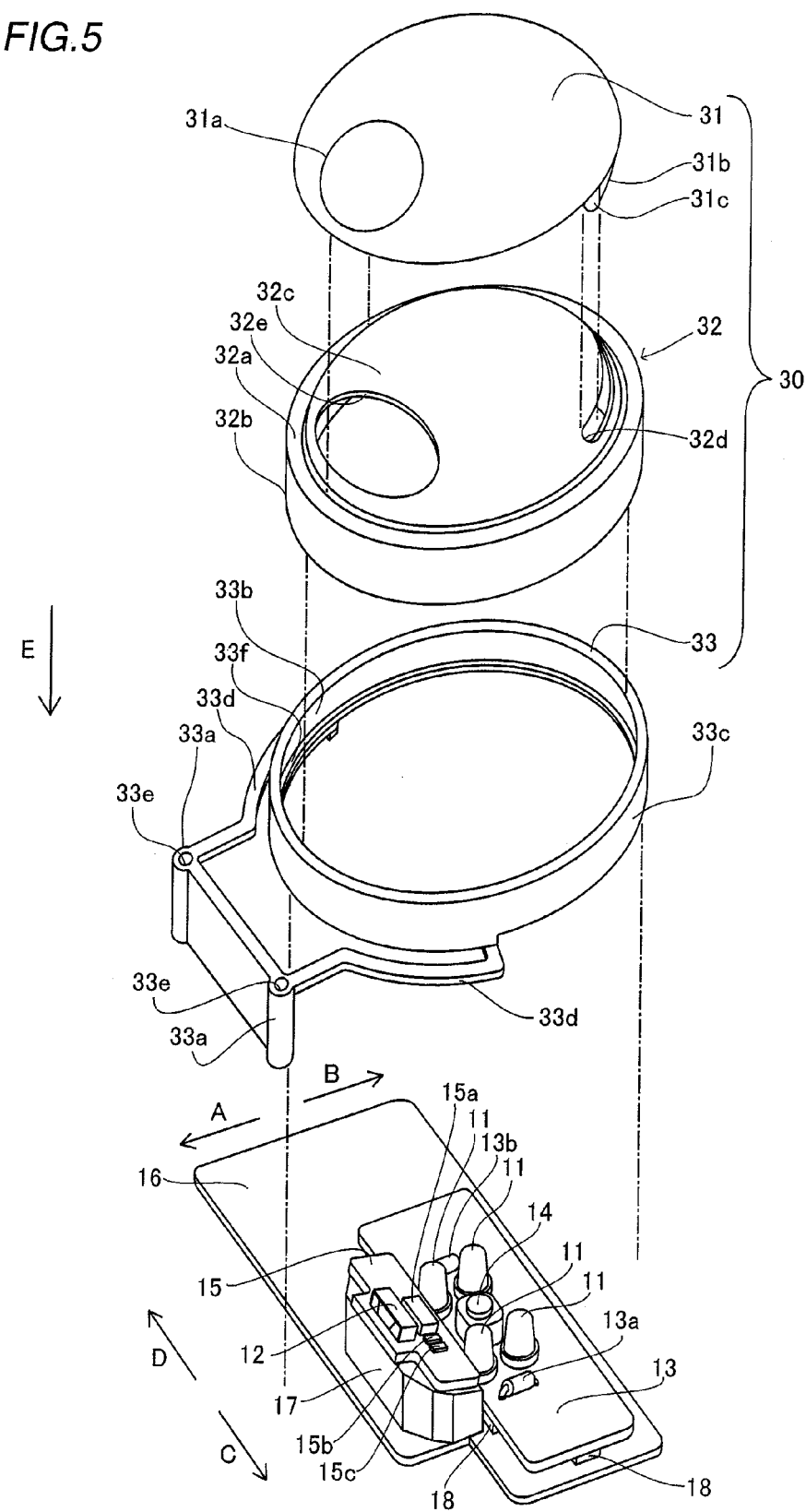
FIG. 5 is an exploded perspective view showing the structure of the portion around the power supply button of the sublimatic printer according to the embodiment of the present invention shown in FIG. 1.

According to this embodiment, the power supply button 30 (see FIG. 1) is constituted of a lid member 31, a light guide member 32 and a button support portion 33 as shown in FIGS. 4 and 5, and mounted on the opening 10g of the upper surface 10a of the housing 10 as shown in FIG. 2. The lid member 31 is in the form of a dome, and functions as an infrared filter member capable of transmitting infrared light while blocking visible light.

According to this embodiment, the light guide member 32 is constituted of a circumferential emission surface 32a (see FIG. 9), a circumferential light guide portion 32b guiding light emitted from the four display LEDs 11 to the circumferential emission surface 32a and a circular dome portion 32c integrally formed inside the circumferential light guide portion 32b as shown in FIG. 5, and so arranged as to cover the display LEDs 11 and the infrared receiving portion 12. The dome portion 32c has a light guide function, similarly to the light guide portion 32b.

As shown in FIG. 5, a print portion 31a is printed on the upper surface of the lid member 31 as a mark indicating the infrared receiving portion 12, for example.

Figure 6:
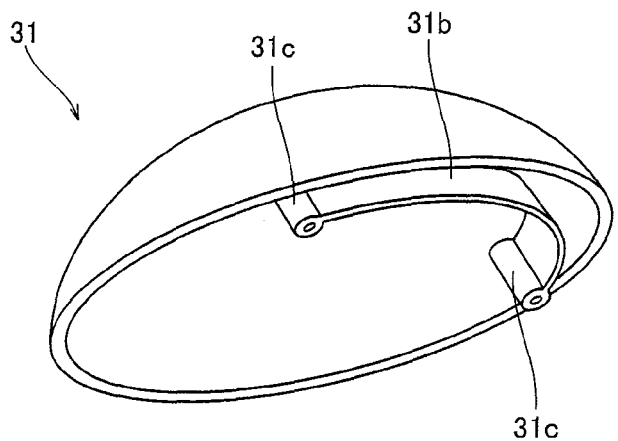
FIG. 6 is a perspective view of a lid member in the power supply button of the sublimatic printer according to the embodiment of the present invention shown in FIG. 1.
Figure 7:
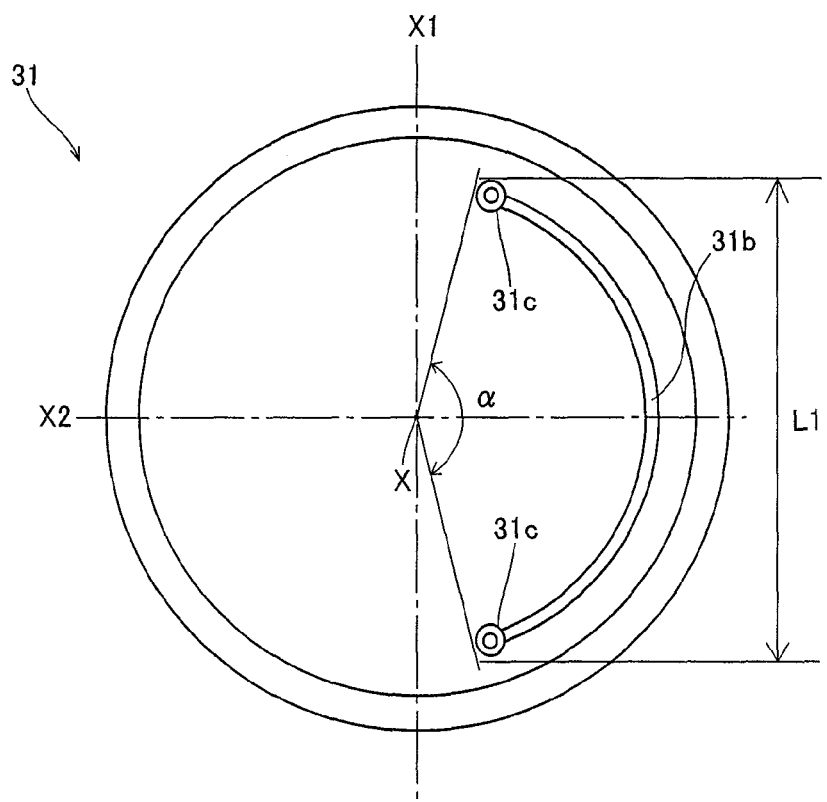
FIG. 7 is a plan view of the lid member in the power supply button of the sublimatic printer according to the embodiment of the present invention shown in FIG. 1.
Figure 8:
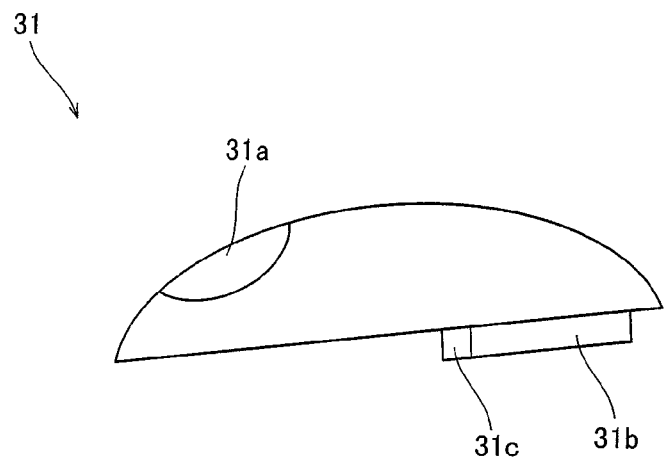
FIG. 8 is a side elevational view of the lid member in the power supply button of the sublimatic printer according to the embodiment of the present invention shown in FIG. 1.

According to this embodiment, a rib-shaped wall portion 31b for adjusting the quantity of the light emitted from the display LEDs 11 and guided to the emission surface 32a is provided on the lower surface of the lid member 31, as shown in FIGS. 6 to 8. The wall portion 31b is integrally provided on the lid member 31, and formed to be inserted into a receiving hole 32d provided in the dome portion 32c of the light guide member 32 described later. The wall portion 31b is arranged in the vicinity of the inner side of the light guide portion 32b.

According to this embodiment, the dome portion 32c is provided with the receiving hole 32d for receiving the wall portion 31b of the lid member 31 and a passage hole 32e so formed that an infrared signal transmitted from the portable telephone 60 (see FIG. 1) is received in the infrared receiving portion 12c through the lid member 31 and the dome portion 32c. The passage hole 32e and the wall portion 31b are arranged on the sides opposite to each other with respect to the central points X of the lid member 31 and the light guide member 32 in plan view. The receiving hole 32d is an example of the "first hole" in the present invention. The passage hole 32e is an example of the "second hole" in the present invention.

Figure 9:
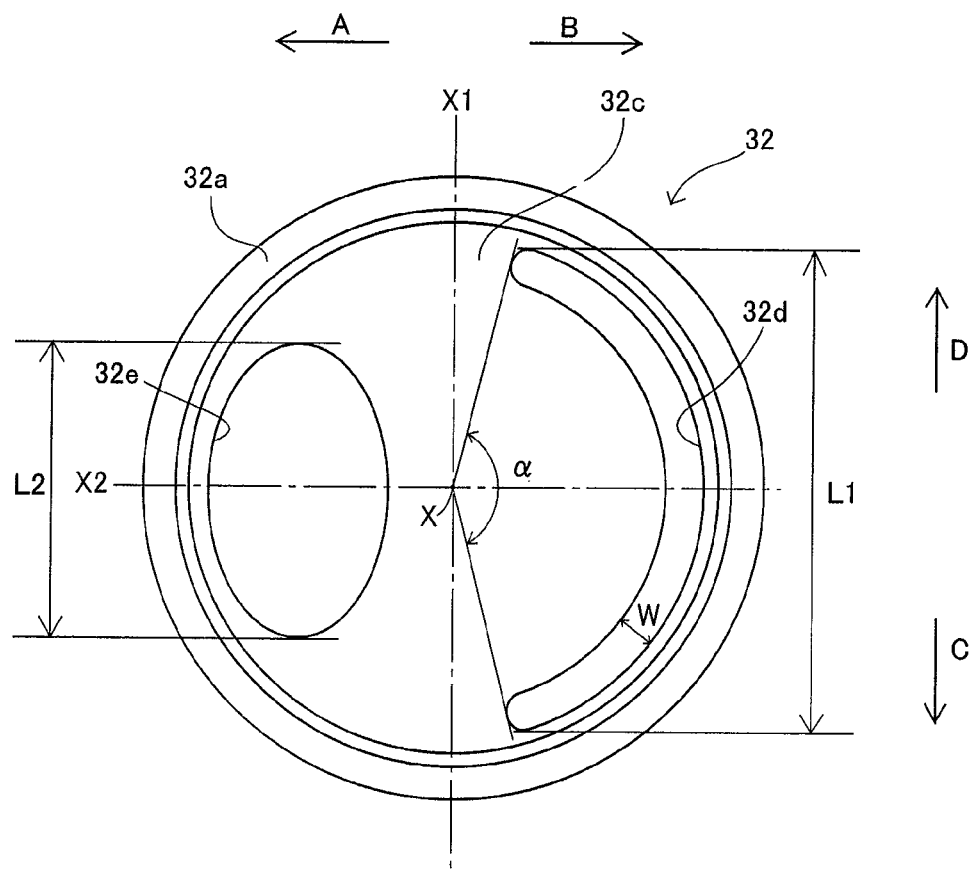
FIG. 9 is a plan view of a light guide member in the power supply button of the sublimatic printer according to the embodiment of the present invention shown in FIG. 1.
Figure 10:
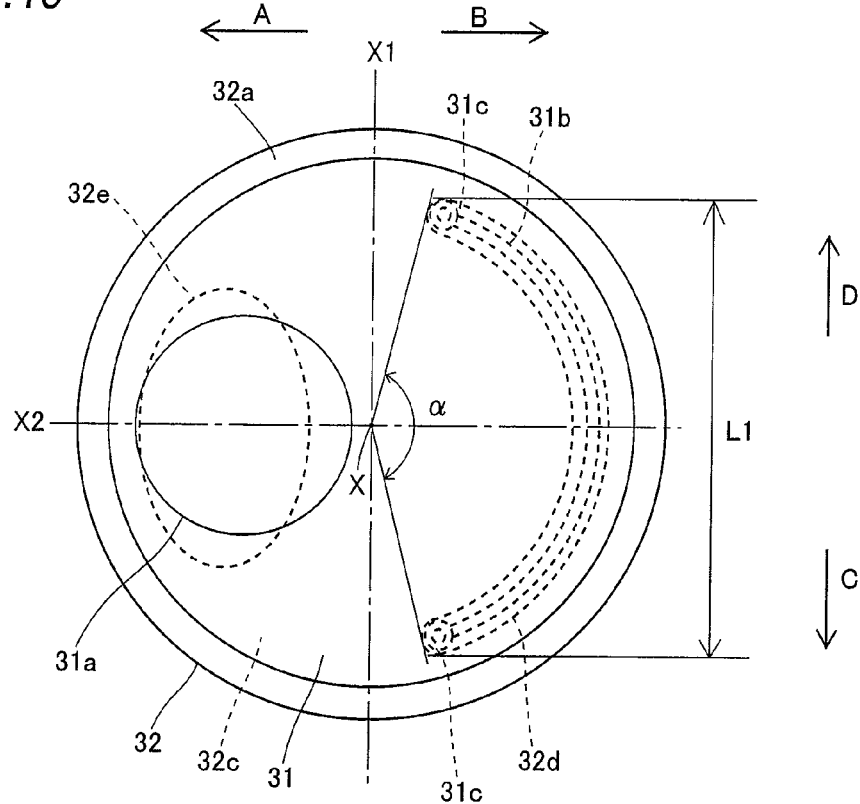
FIG. 10 is a plan view showing the light guide member mounted on the light guide member in the power supply button of the sublimatic printer according to the embodiment of the present invention shown in FIG. 1.

According to this embodiment, the wall portion 31b of the lid member 31 is arcuately formed along the circumferential emission surface 32a (see FIG. 9) of the light guide member 32, as shown in FIG. 10. More specifically, the lid member 31 and the light guide member 32 (dome portion 32c) are circumferentially formed about the central points (central portions) X where central lines X1 and X2 intersect with each other respectively and concentric with each other, as shown FIGS. 7 and 10. The wall portion 31b is so arcuately formed that the lid member 31 and the light guide member 32 have a prescribed central angle α of less than 180° about the central points (central portions) X respectively.

Figure 11:
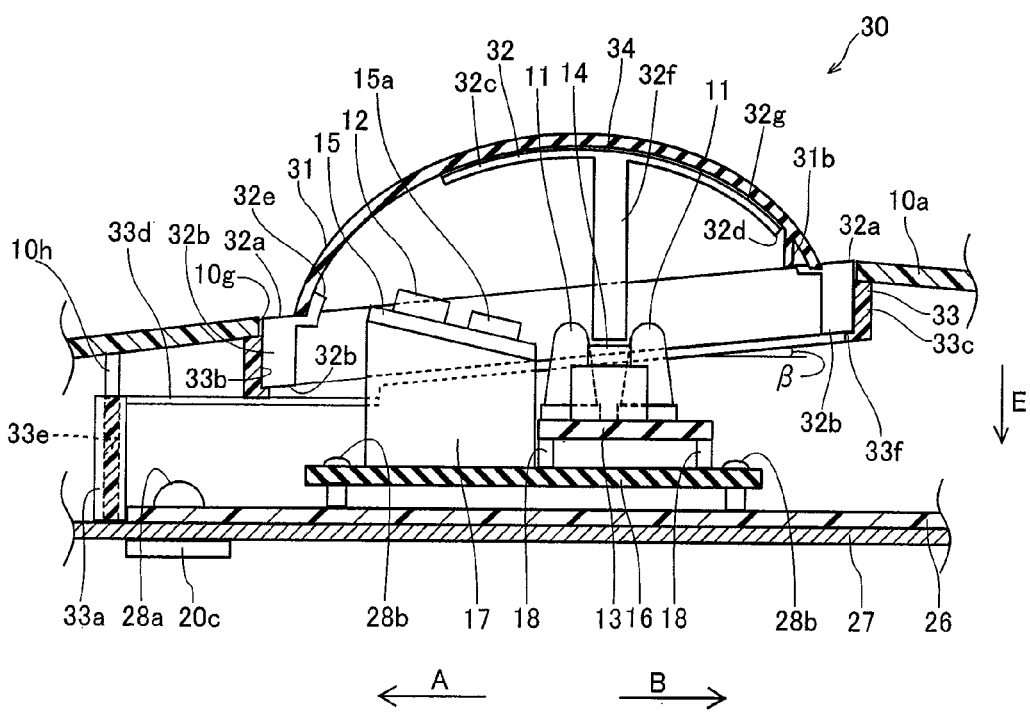
FIG. 11 is a sectional view showing a portion around the power supply button of the sublimatic printer according to the embodiment of the present invention shown in FIG. 1.

According to this embodiment, the wall portion 31b is so formed as to protrude downward from the receiving hole 32d of the dome portion 32c, as shown in FIGS. 8 and 11. The wall portion 31b can adjust the light emitted from the display LEDs 11 by adjusting the arcuate angle α and the length L1 (see FIG. 7) of the wall portion 31b.

According to this embodiment, the receiving hole 32d of the dome portion 32c is in the form of an arcuate slot corresponding to the arcuately formed wall portion 31b, as shown in FIG. 10. The receiving hole 32d and the wall portion 31b are arranged on the sides closer to the display LEDs 11 with respect to the central points X of the lid member 31 and the light guide member 32 in plan view.

The receiving hole 32d has a substantially uniform width W, as shown in FIG. 9. The length L1 of the receiving hole 32d along arrows C and D (perpendicular to the extensional direction of a straight line connecting the centers of the receiving hole 32d and the wall portion 31b with each other) is larger than the length L2 of the passage hole 32e along arrows C and D.

According to this embodiment, cylindrical positioning portions 31c having an outer diameter substantially identical to the inner diameter (width W in FIG. 9) of both ends of the receiving hole 32d of the dome portion 32c are provided on both ends of the wall portion 31b of the lid member 31, as shown in FIGS. 6, 7 and 8.

As shown in FIG. 11, the light guide member 32 is inclined at an angle β with respect to a horizontal plane so that the front side (along arrow A) thereof lowers along the inclination of the upper surface 10a of the housing 10.

Figure 12:
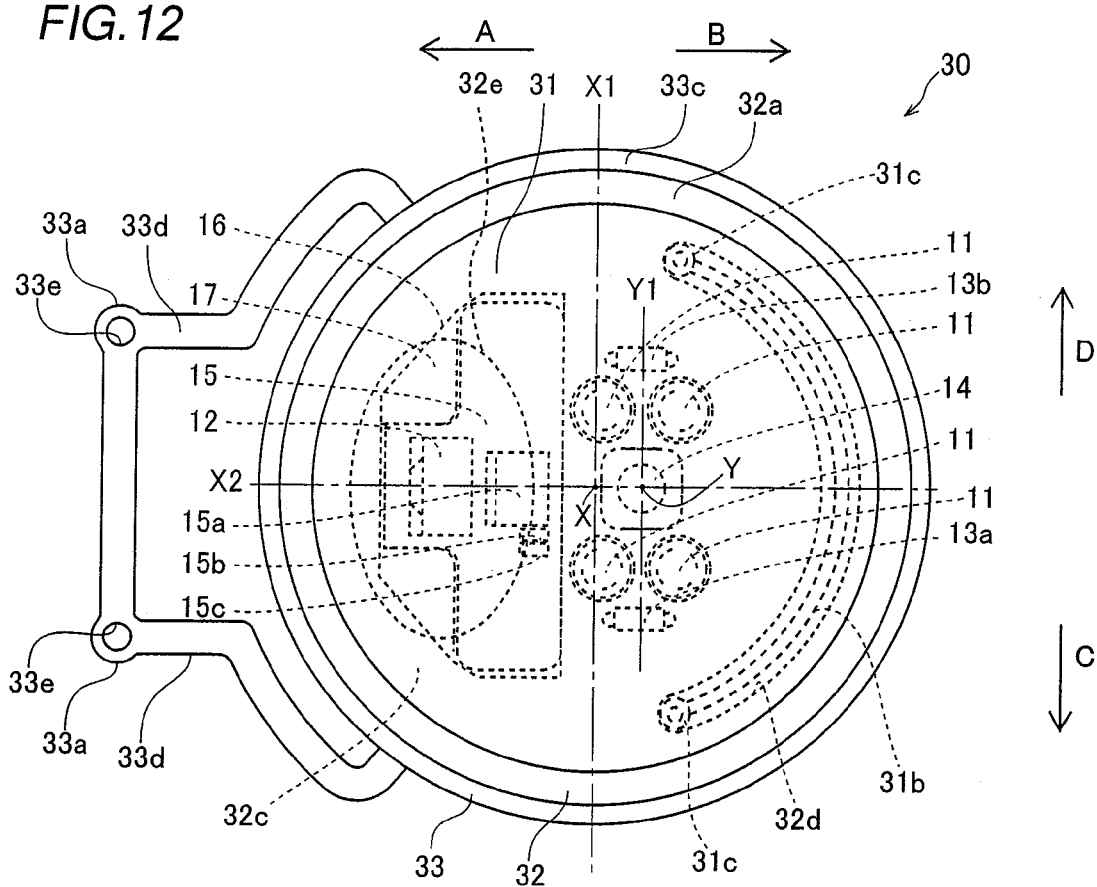
FIG. 12 is a plan view showing the portion around the power supply button of the sublimatic printer according to the embodiment of the present invention shown in FIG. 1.

As shown in FIG. 12, the four display LEDs 11 are arranged in pairs on sides of the switch portion 14 along arrows C and D respectively so that the central portion of the region enclosed with the four display LEDs 11 coincides with (the central point Y of) the switch portion 14, and the central point (central portion) Y of the switch portion 14 formed by a central line Y1 and the central line X2 is arranged closer to the wall portion 31b (along arrow B) with respect to the central point X of the dome portion 32c. In other words, the central portion of the region enclosed with the four display LEDs 11 and the switch portion 14 are arranged on a position deviating toward the wall portion 31b from the central position (central point X) of the dome portion 32c.

Figure 13:
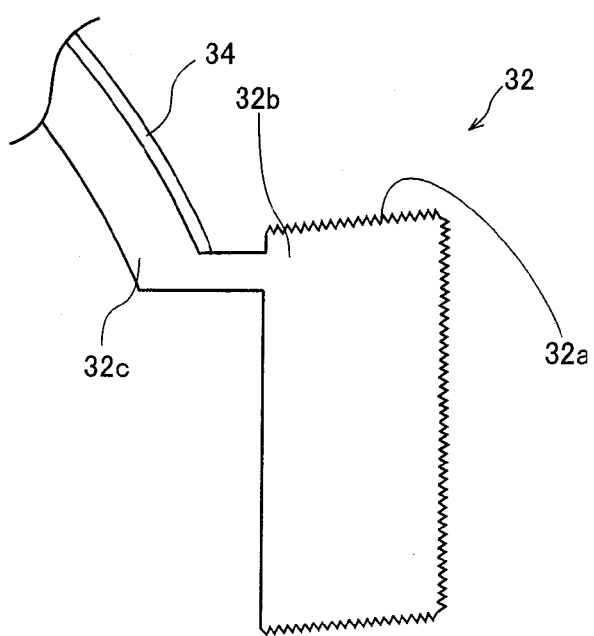
FIG. 13 is an enlarged sectional view showing a fine irregular shape of the light guide portion of the sublimatic printer according to the embodiment of the present invention shown in FIG. 1.

As shown in FIG. 13, the emission surface 32a and the light guide portion 32b of the light guide member 32 are finely irregularly embossed for diffusing light, so that the emission surface 32a can be uniformly brightened with the diffused light.

As shown in FIG. 11, the dome portion 32c is provided with a switch pressing portion 32f for pressing the switch portion 14 (see FIG. 3) when the power supply button 30 (see FIG. 1) is pressed on a position opposed to the switch portion 14. A whitely coated reflecting layer 34 having a light reflecting function is formed on an outer surface 32g of the dome portion 32c, in order to inhibit the light emitted from the display LEDs 11 to enter the dome portion 32c from outgoing from the outer surface 32g.

Figure 14:
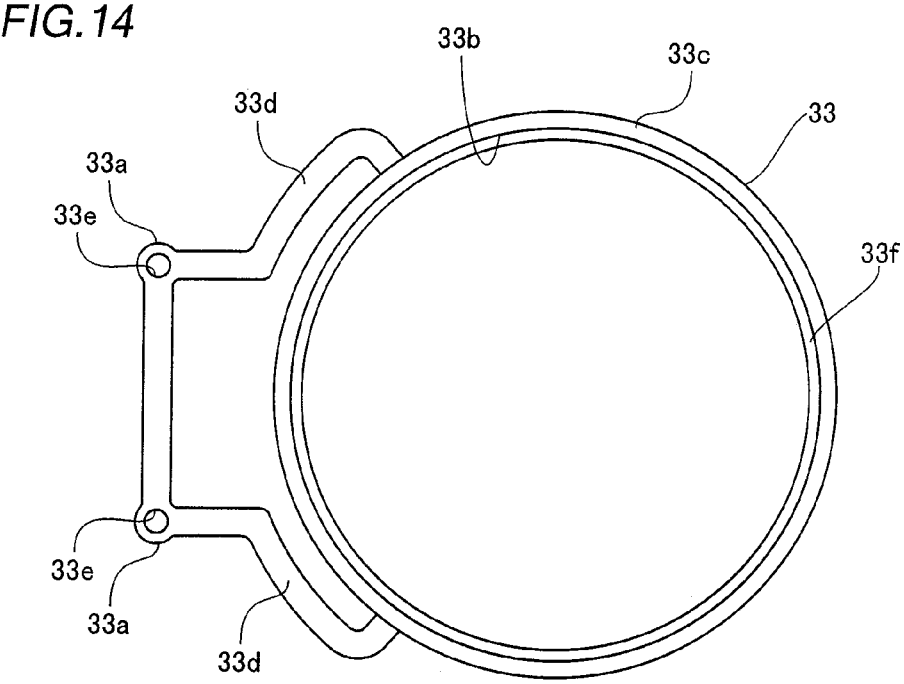
FIG. 14 is a plan view showing a button support portion of the sublimatic printer according to the embodiment of the present invention shown in FIG. 1.

The button support portion 33 is constituted of mount portions 33a to be mounted on the protrusions 10h (see FIG. 11) provided on the upper surface 10a of the housing 10, a ring portion 33c having an inner peripheral surface 33b so formed as to come into contact with the outer side surface of the light guide portion 32b and arm portions 33d linking the mount portions 33a and the ring portion 33c with each other, as shown in FIGS. 5, 11 and 14. The mount portions 33a have receiving holes 33e capable of receiving (being press-fitted with) the protrusions 10h. The protrusions 10h are lightly press-fitted into the receiving holes 33e for mounting the upper portions of the mount portions 33a on the upper surface 10a of the housing 10, while the lower surfaces of the mount portions 33a come into contact with the upper surface of the top plate 27 for fixing the mount portions 33a of the button support portion 33. The ring portion 33c has an L-shaped receiving portion 33f provided on a lower portion of the inner peripheral surface 33b for preventing the light guide member 32 from dropping. As shown in FIG. 5, the power supply button 30 is assembled by inserting the light guide member 32 mounted with the lid member 31 into the ring portion 33c along arrow E. First ends of the arm portions 33d are fixed to the upper ends of the mount portions 33a, while second ends thereof are fixed to the lower surface of the ring portion 33c respectively. In other words, the arm portions 33d extending from the fixed mount portions 33a support the assembled power supply button 30. More specifically, the arm portions 33d are deflected about the first ends closer to the mount portions 33a with respect to pressing force P along arrow E so that the power supply button 30 mounted with the mount portions 33a of the button support portion 33 is movable in the pressing direction (along arrow E), as shown in FIG. 11. When the power supply button 30 is pressed along arrow E, therefore, the arm portions 33d are deflected about the first ends closer to the mount portions 33a, thereby moving the switch pressing portion 32f provided on the light guide member 32 in the pressing direction for pressing the switch portion 14. When released from the pressing force P, the power supply button 30 is moved upward by upward urging force of the deflected arm portions 33d and returned to the original position.

The paths of the light emitted from the display LEDs 11 of the sublimatic printer 1 according to the embodiment of the present invention are now described with reference to FIGS. 9, 12, 15 and 16.

Figure 15:
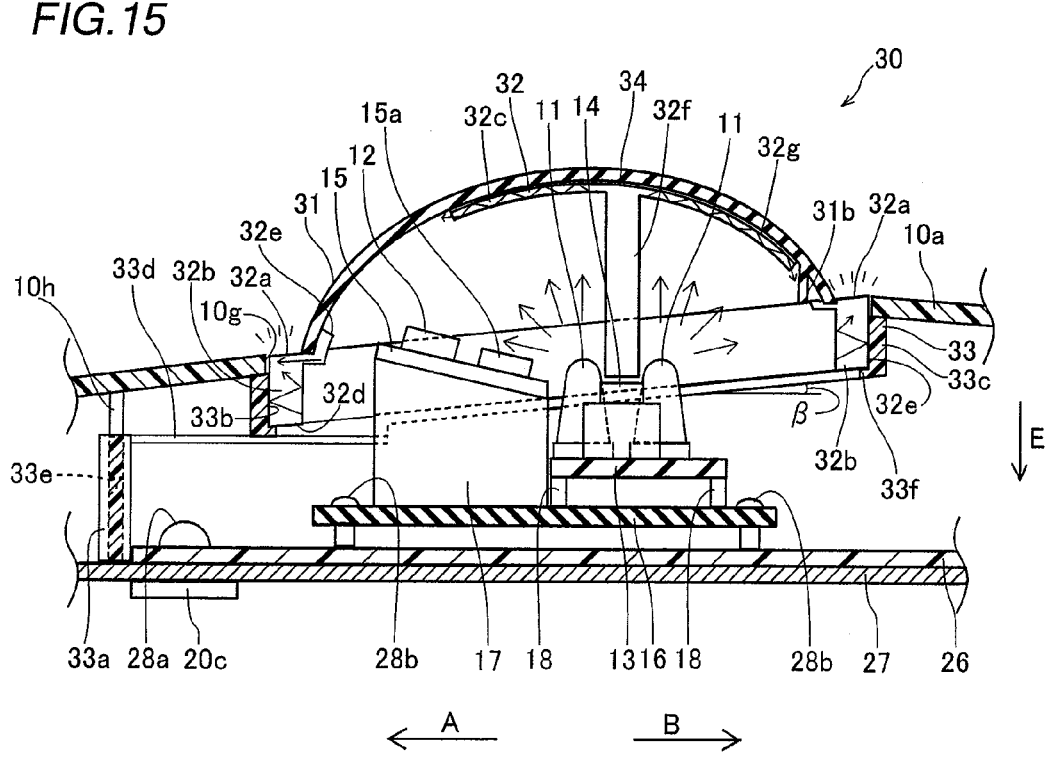
FIG. 15 is a sectional view for illustrating paths of light emitted from the display LEDs of the sublimatic printer according to the embodiment of the present invention shown in FIG. 1.
Figure 16:
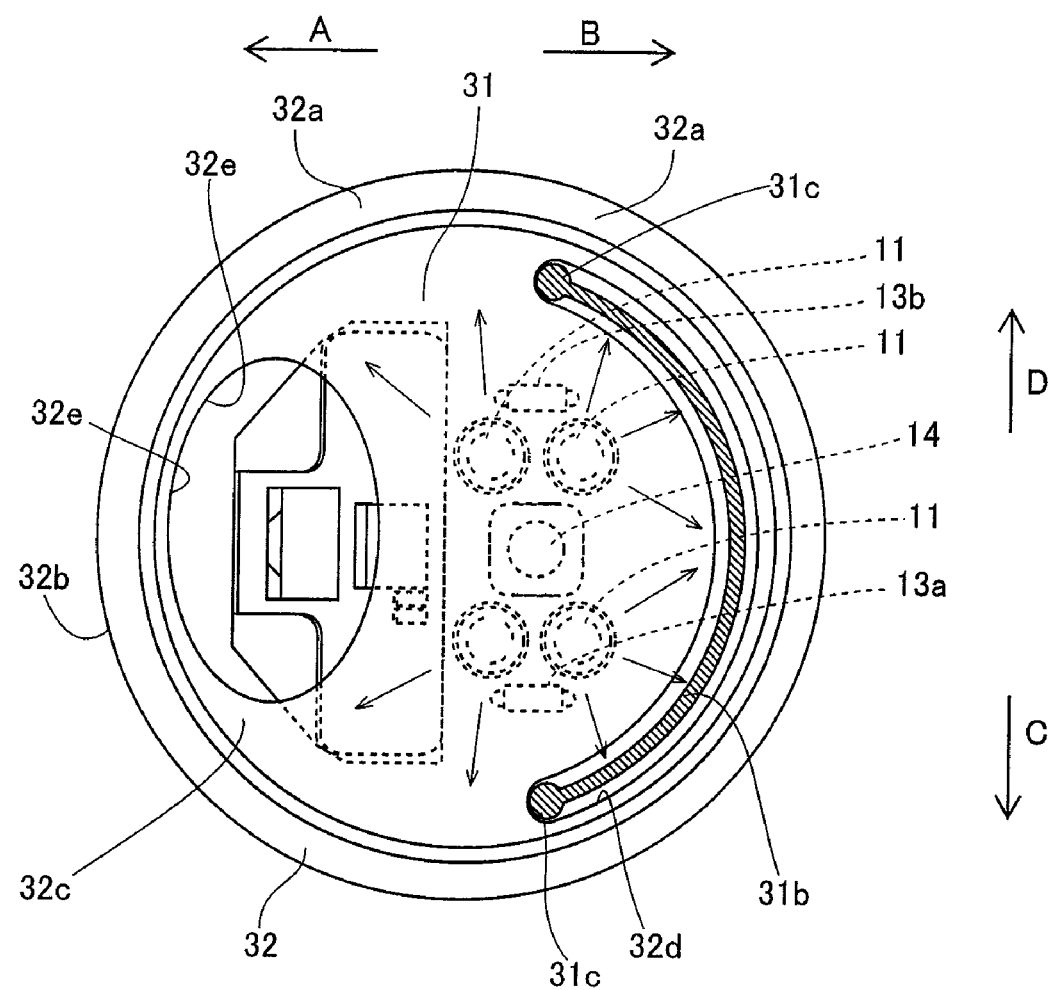
FIG. 16 is a plan view for illustrating the paths of the light emitted from the display LEDs of the sublimatic printer according to the embodiment of the present invention shown in FIG. 1.

As shown in FIGS. 15 and 16, the light emitted from the display LEDs 11 is applied to the inner surface of the dome portion 32c of the light guide member 32 and the inner peripheral side surface of the light guide portion 32b. The light applied to the inner surface of the dome portion 32c to enter the dome portion 32c is reflected by the reflecting layer 34 formed on the outer surface 32g of the dome portion 32c. The reflected light is repetitively reflected by the inner surface and the outer surface 32g, to reach the emission surface 32a through the dome portion 32c. The light applied to the inner peripheral side surface of the light guide portion 32b to enter the light guide portion 32b is repetitively reflected by the lower surface, the outer peripheral side surface and the inner peripheral side surface of the light guide portion 32b, to reach the emission surface 32a through the light guide portion 32b.

The central portion of the region enclosed with the four display LEDs 11 is arranged closer to the wall portion 31b (along arrow B) with respect to the central line X1 (see FIG. 12) for the lid member 31 and the light guide member 32, whereby the light emitted from the display LEDs 11 easily reaches the part closer to the wall portion 31b (along arrow B). On the other hand, the infrared receiving portion 12 is arranged oppositely to the wall portion 31b (along arrow A) with respect to the central line X1 (see FIG. 12) for the lid member 31 and the light guide member 32 to serve as an obstacle to the paths of the light, whereby the light emitted from the display LEDs 11 hardly reaches the part opposite to the wall portion 31b (along arrow A). In other words, the light more easily reaches the part of the dome portion 32b along arrow B as compared with the part along arrow A, whereby the part of the circumferential emission surface 32a along arrow B can be more easily brightened as compared with the part along arrow A.

The receiving hole 32d is provided on the part of the dome portion 32c along arrow B for receiving the wall portion 31b of the lid member 31, whereby the light passing through the dome portion 32c toward the wall portion 31b outgoes from the receiving hole 32d when reaching the receiving hole 32d, and is blocked by the wall portion 31b, not to reach the light guide portion 32b and the emission surface 32a. According to this embodiment, further, the length L1 (see FIG. 9) of the wall portion 31b along arrows C and D is larger than the length L2 (see FIG. 9) of the passage hole 32e, whereby the light reaching the light guide portion 32b and the emission surface 32a through the dome portion 32c along arrow B and that reaching the light guide portion 32b and the emission surface 32a through the dome portion 32c along arrow A are substantially equivalent in brightness to each other. In other words, the light passing through the dome portion 32c is guided to the emission surface 32a in the state adjusted by the wall portion 31b of the lid member 31, thereby uniformly brightening the emission surface 32a.

According to this embodiment, as hereinabove described, the dome portion 32c having the light guide function so provided as to cover the display LEDs 11 includes the receiving hole 32d while the lid member 31 so provided as to cover the dome portion 32c of the light guide member 32 includes the wall portion 31b inserted into the receiving hole 32d of the dome portion 32c for adjusting the light emitted from the display LEDs 11 and guided to the peripheric emission surface 32a, whereby the light emitted from the display LEDs 11 to pass through the dome portion 32c can be guided to the peripheric emission surface 32a in the state adjusted by the wall portion 31b. Even when the display LEDs 11 are arranged on a position deviating from that opposed to the central portion of the emission surface 32a of the light guide member 32, therefore, the emission surface 32a can be uniformly brightened.

According to this embodiment, the peripheral emission surface 32a is circumferentially formed in plan view while the wall portion 31b of the lid member 31 is arcuately formed along the circumferential emission surface 32a to protrude downward from the receiving hole 32d of the dome portion 32c so that the wall portion 31b can be arranged along the circumferential emission surface 32a, thereby guiding the light emitted from the display LEDs 11 to outgo from the dome portion 32c through the receiving hole 32d to the circumferential emission surface 32a in a reliably adjusted state.

According to this embodiment, the receiving hole 32d of the dome portion 32c is in the form of the arcuate slot corresponding to the arcuate wall portion 31b so that the shape of the receiving hole 32d of the dome portion 32c corresponds to that of the wall portion 31b, whereby the wall portion 31b of the lid member 31 can be easily inserted into the receiving hole 32d of the dome portion 32c.

According to this embodiment, the cylindrical positioning portions 31c having the outer diameter substantially identical to the inner diameter of both ends of the receiving hole 32d of the dome portion 32c so that the positioning portions 31c provided on both ends of the wall portion 31b are arranged on both ends of the receiving hole 32d of the dome portion 32c respectively when the wall portion 31b is inserted into the receiving hole 32d, whereby the position of the lid ember 31 with respect to the dome portion 32c can be easily held. Therefore, the print portion 31a of the lid member 31 can be easily positioned.

According to this embodiment, the dome portion 32c is provided with the passage hole 32e, the lid member 31 functions as an infrared filter member and the infrared receiving portion 12 is provided on the region covered with the dome portion 32c to be adjacent to the display LEDs 11, whereby light such as visible light other than infrared light is not transmitted through the lid member 31 while infrared light is transmitted through the lid member 31 and can reach the infrared receiving portion 12 through the passage hole 32e. Therefore, no infrared filter member may be separately provided for infrared communication, whereby increase in the number of components can be suppressed.

According to this embodiment, the wall member 31b is integrally formed on the lid member 31 so that no wall member may be separately provided in order to uniformly brighten the emission surface 32a of the light guide member 32, whereby increase in the number of components can be suppressed also by this.

Although the present invention has been described and illustrated in detail, it is clearly understood that the same is by way of illustration and example only and is not to be taken by way of limitation, the spirit and scope of the present invention being limited only by the terms of the appended claims.

For example, while the present invention is applied to the sublimatic printer employed as an exemplary image generating apparatus in the aforementioned embodiment, the present invention is not restricted to this but is also applicable to another image generating apparatus other than the sublimatic printer, so far as the same comprises a light-emitting device portion emitting light for display.

While the wall portion of the lid member is arcuately formed along the emission surface of the light guide member in the aforementioned embodiment, the present invention is not restricted to this but the wall portion may alternatively be formed in a shape other than the arcuate shape.

While the display LEDs are arranged closer to the wall portion of the lid member with respect to the central point X of the circumferential light guide member in the aforementioned embodiment, the present invention is not restricted to this but the display LEDs may alternatively be positioned on the central point of the light guide member.

While the portable telephone is employed in the aforementioned embodiment as the apparatus capable of making infrared communication, the present invention is not restricted to this but another apparatus other than the portable telephone may alternatively be employed, so far as the same is capable of making infrared communication.

What is claimed is:

1. An image generating apparatus comprising:
   a light-emitting device portion emitting light for display;
   a light guide member, so arranged as to enclose said light-emitting device portion, including a peripheric emission surface, a peripheric light guide portion guiding said light emitted from said light-emitting device portion to said emission surface and a dome portion, having a light guide function, provided inside said peripheric light guide portion continuously with said light guide portion for covering said light-emitting device portion; and
   a lid member so provided as to cover said dome portion of said light guide member, wherein
   said dome portion includes a first hole,
   said lid member includes a wall portion inserted into said first hole of said dome portion for adjusting said light emitted from said light-emitting device portion and guided to said peripheric emission surface,
   said peripheric emission surface is circumferentially formed in plan view, and
   said wall portion of said lid member is arcuately formed along said circumferential emission surface.

2. The image generating apparatus according to claim 1, wherein
   said light-emitting device portion is arranged on a position deviating from the center of said light guide member in plan view, and
   said wall portion is arranged closer to said light-emitting device portion with respect to the center of said light guide member.

3. The image generating apparatus according to claim 1, wherein
   said wall portion of said lid member protrudes downward from said first hole of said dome portion.

4. The image generating apparatus according to claim 3, wherein
   said first hole of said dome portion is in the form of an arcuate slot corresponding to said arcuate wall portion.

5. The image generating apparatus according to claim 4, wherein
   said wall portion includes cylindrical positioning portions provided on both ends of said wall portion with an outer diameter substantially identical to the inner diameter of both ends of said first hole of said dome portion.

6. The image generating apparatus according to claim 3, wherein
   the central angle of said arcuate wall portion about the center of said light guide member is less than 180° in plan view.

7. The image generating apparatus according to claim 1, wherein
   said dome portion further includes a second hole, and
   said lid member functions as an infrared filter member,
   the image generating apparatus further comprising an infrared receiving portion provided on a region covered with said dome portion to be adjacent to said light-emitting device portion.

8. The image generating apparatus according to claim 7, wherein
   said wall portion is arranged oppositely to said second hole with respect to the center of said light guide member.

9. The image generating apparatus according to claim 8, wherein
   the length of said wall portion in a first direction perpendicular to the extensional direction of a straight line connecting the centers of said wall portion and said second hole with each other is larger than the length of said second hole in said first direction.

10. The image generating apparatus according to claim 1, wherein
    said wall portion is arranged in the vicinity of the inner side of said peripheric light guide portion.

11. The image generating apparatus according to claim 1, wherein
    said wall portion is integrally formed on said lid member.

12. An image generating apparatus comprising:
    a light-emitting device portion emitting light for display;
    a light guide member, so arranged as to enclose said light-emitting device portion, including a peripheric emission surface, a peripheric light guide portion guiding said light emitted from said light-emitting device portion to said emission surface and a dome portion, having a light guide function, provided inside said peripheric light guide portion continuously with said light guide portion for covering said light-emitting device portion;
    a lid member so provided as to cover said dome portion of said light guide member; and
    an infrared receiving portion provided on a region covered with said dome portion to be adjacent to said light-emitting device portion, wherein
    said dome portion includes a first hole and a second hole,
    said lid member includes a wall portion inserted into said first hole of said dome portion for adjusting said light emitted from said light-emitting device portion and guided to said peripheric emission surface,
    said peripheric emission surface is circumferentially formed in plan view,
    said wall portion of said lid member is arcuately formed along said circumferential emission surface to protrude downward from said first hole of said dome portion,
    said first hole of said dome portion is in the form of an arcuate slot corresponding to said arcuate wall portion,
    said wall portion includes cylindrical positioning portions provided on both ends of said wall portion with an outer diameter substantially identical to the inner diameter of both ends of said first hole of said dome portion,
    said lid member functions as an infrared filter member, and
    said wall portion is integrally formed on said lid member.

13. The image generating apparatus according to claim 12, wherein
    said light-emitting device portion is arranged on a position deviating from the center of said light guide member in plan view, and said wall portion is arranged closer to said light-emitting device portion with respect to the center of said light guide member.

14. The image generating apparatus according to claim 12, wherein
the central angle of said arcuate wall portion about the center of said light guide member is less than 180° in plan view.

15. The image generating apparatus according to claim 12, wherein
said wall portion is arranged oppositely to said second hole with respect to the center of said light guide member.

16. The image generating apparatus according to claim 15, wherein
the length of said wall portion in a first direction perpendicular to the extensional direction of a straight line connecting the centers of said wall portion and said second hole with each other is larger than the length of said second hole in said first direction.

17. The image generating apparatus according to claim 12, wherein
said wall portion is arranged in the vicinity of the inner side of said peripheric light guide portion.

* * * * *